United States Patent
Boehm et al.

(10) Patent No.: US 10,464,489 B2
(45) Date of Patent: Nov. 5, 2019

(54) INTEGRATED VEHICLE COMMUNICATION SYSTEM AND METHOD

(71) Applicant: Gentex Corporation, Zeeland, MI (US)

(72) Inventors: Neil J. Boehm, Allegan, MI (US); Steven L. Geerlings, Holland, MI (US); Thomas S. Wright, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 200 days.

(21) Appl. No.: 15/299,526

(22) Filed: Oct. 21, 2016

(65) Prior Publication Data

US 2017/0113619 A1     Apr. 27, 2017

Related U.S. Application Data

(60) Provisional application No. 62/245,052, filed on Oct. 22, 2015.

(51) Int. Cl.
| | | |
|---|---|---|
| *G07B 15/06* | (2011.01) | |
| *B60R 1/12* | (2006.01) | |
| *B60R 1/04* | (2006.01) | |
| *G07C 9/00* | (2006.01) | |
| *B60Q 9/00* | (2006.01) | |

(52) U.S. Cl.
CPC .............. *B60R 1/12* (2013.01); *B60Q 9/00* (2013.01); *B60R 1/04* (2013.01); *G07B 15/06* (2013.01); *G07B 15/063* (2013.01); *G07C 9/00309* (2013.01); *B60R 2001/1253* (2013.01); *B60R 2001/1284* (2013.01); *G06Q 2240/00* (2013.01); *G07C 2009/00928* (2013.01)

(58) Field of Classification Search
CPC .... B60Q 9/00; B60R 1/12; B60R 1/04; G07B 15/06; G07B 15/063; G07C 9/00309
See application file for complete search history.

(56) References Cited

U.S. PATENT DOCUMENTS

| | | | | |
|---|---|---|---|---|
| 5,376,943 A | * | 12/1994 | Blunden | G08G 1/017 343/702 |
| 6,124,886 A | * | 9/2000 | DeLine | B60Q 1/2665 348/148 |
| 6,158,655 A | * | 12/2000 | DeVries, Jr. | B60R 1/12 235/380 |

(Continued)

FOREIGN PATENT DOCUMENTS

EP     1 777 108     4/2007

OTHER PUBLICATIONS

Kumawat "Automatic Toll Collection System Using RFID", published by Iternational Journal of Electrical and Electronics Reasearch, on Jun. 2014, all pages (Year: 2014).*

*Primary Examiner* — Brian M Epstein
*Assistant Examiner* — Omar Zeroual
(74) *Attorney, Agent, or Firm* — Price Heneveld LLP; Bradley D. Johnson

(57) ABSTRACT

A vehicle rearview mirror system for a vehicle having communication capabilities for communicating with at least one of a building-automation device and an electronic toll collection system. The vehicle rearview mirror system may include a wireless communication system configured to communicate with a building-based communication system or a transceiver system of the electronic toll collection system, or both.

13 Claims, 5 Drawing Sheets

(56) References Cited

U.S. PATENT DOCUMENTS

| | | | |
|---|---|---|---|
| 6,172,613 B1* | 1/2001 | DeLine | B60K 35/00 340/815.4 |
| 6,339,384 B1 | 1/2002 | Valdes-Rodriguez | |
| 6,445,287 B1* | 9/2002 | Schofield | B60C 23/0401 340/442 |
| 6,690,268 B2* | 2/2004 | Schofield | B60C 23/00 340/438 |
| 7,970,446 B2* | 6/2011 | Witkowski | G07C 5/008 455/575.9 |
| 8,311,559 B1* | 11/2012 | Morrow | H04M 1/7253 455/456.1 |
| 8,948,727 B2* | 2/2015 | Tang | H04W 4/046 455/411 |
| 9,064,358 B2* | 6/2015 | Lidror | G07C 1/30 |
| 9,688,202 B2* | 6/2017 | Nyalamadugu | G06K 19/07794 |
| 9,836,740 B1* | 12/2017 | Geist | G06Q 20/3821 |
| 9,911,169 B1* | 3/2018 | Geist | G06Q 50/30 |
| 2001/0055165 A1* | 12/2001 | McCarthy | B60R 1/12 359/839 |
| 2002/0159270 A1* | 10/2002 | Lynam | B60K 35/00 362/492 |
| 2004/0184282 A1 | 9/2004 | Nishijima et al. | |
| 2007/0285256 A1* | 12/2007 | Batra | G01M 5/00 340/572.8 |
| 2008/0291047 A1* | 11/2008 | Summerford | G07C 9/00182 340/5.71 |
| 2010/0159846 A1* | 6/2010 | Witkowski | G07C 9/00857 455/70 |
| 2010/0176915 A1* | 7/2010 | Hayes | G08C 17/02 340/5.2 |
| 2010/0201896 A1* | 8/2010 | Ostreko | B60R 1/12 349/1 |
| 2010/0210220 A1* | 8/2010 | Chutorash | G07C 9/00309 455/68 |
| 2010/0280956 A1* | 11/2010 | Chutorash | G06Q 20/20 705/64 |
| 2010/0289618 A1* | 11/2010 | Crucs | G08C 17/00 340/5.61 |
| 2011/0018694 A1* | 1/2011 | Geerlings | G08C 17/02 340/12.28 |
| 2011/0202393 A1* | 8/2011 | Dewakar | G06Q 20/102 705/13 |
| 2011/0282717 A1* | 11/2011 | Aschenbrenner | G07B 15/063 705/13 |
| 2011/0296027 A1* | 12/2011 | Salmela | H04L 29/12028 709/226 |
| 2011/0311052 A1* | 12/2011 | Myers | G07C 9/00103 380/270 |
| 2012/0112882 A1* | 5/2012 | Martinez de Velasco Cortina | G06K 7/0008 340/5.74 |
| 2012/0126942 A1* | 5/2012 | Geerlings | G07C 9/00857 340/5.61 |
| 2012/0143403 A1* | 6/2012 | Cho | B60R 1/04 701/2 |
| 2012/0232964 A1* | 9/2012 | Brands | G07B 15/063 705/13 |
| 2012/0313744 A1* | 12/2012 | Vuyst | H04L 9/3271 340/4.3 |
| 2013/0006724 A1* | 1/2013 | Simanek | G06Q 30/0207 705/13 |
| 2014/0025444 A1* | 1/2014 | Willis | G06Q 20/3272 705/13 |
| 2014/0085110 A1* | 3/2014 | Scofield | G07B 15/04 340/932.2 |
| 2014/0111315 A1* | 4/2014 | Geerlings | G07C 9/00309 340/12.5 |
| 2014/0300457 A1* | 10/2014 | Geerlings | G07C 9/00309 340/438 |
| 2014/0313057 A1* | 10/2014 | Kokal | G07B 15/063 340/928 |
| 2015/0002262 A1* | 1/2015 | Geerlings | G07C 9/00309 340/5.25 |
| 2015/0048159 A1* | 2/2015 | Martinez de Velasco Cortina | G06Q 20/3227 235/379 |
| 2015/0058100 A1* | 2/2015 | Spinelli | G07B 15/063 705/13 |
| 2015/0088617 A1* | 3/2015 | Geist | G06Q 20/26 705/13 |
| 2015/0134428 A1* | 5/2015 | Li | G06Q 20/327 705/13 |
| 2015/0228139 A1* | 8/2015 | Geerlings | G08C 17/02 340/5.61 |
| 2015/0294210 A1* | 10/2015 | Martinez de Velasco Cortina | G06Q 20/28 235/492 |
| 2015/0302738 A1* | 10/2015 | Geerlings | G08C 17/02 340/5.25 |
| 2015/0317842 A1* | 11/2015 | Evans | G06Q 20/325 705/13 |
| 2016/0150066 A1* | 5/2016 | Yae | H04M 1/6091 455/41.2 |
| 2016/0171787 A1* | 6/2016 | Yohalashet | G07B 15/063 705/13 |
| 2016/0180604 A1* | 6/2016 | Wilson | G07B 15/063 705/4 |
| 2016/0183653 A1* | 6/2016 | Warther | G06K 19/07726 340/10.51 |
| 2016/0255459 A1* | 9/2016 | Sarkar | H04W 12/04 455/41.1 |
| 2016/0267781 A1* | 9/2016 | Papay | G08C 17/02 |
| 2016/0321479 A1* | 11/2016 | Uhl | G06K 7/10356 |
| 2017/0088056 A1* | 3/2017 | Padilla Haro | B60R 1/12 |
| 2017/0249635 A1* | 8/2017 | Baur | G06Q 20/401 |

\* cited by examiner

INTEGRATED VEHICLE COMMUNICATION SYSTEM AND METHOD

TECHNICAL FIELD

The present disclosure relates to a vehicle communication system, and more particularly to an integrated vehicle communication system including an integrated transmitter system for communicating with a home-based control system and an electronic toll collection system.

BACKGROUND

There are a variety of conventional vehicle communication systems available in the current market. One such conventional communication system includes a radio frequency (RF) transmitter that may be programmed to activate devices associated with a home or dwelling of a vehicle operator. For example, the RF transmitter may be programmed to communicate with a garage door opener, RF-control lighting, gates, and locks or other devices associated with a home of a vehicle operator. In some cases, one or more of the devices associated with the home may utilize different communication protocols, including, for example, the X10 protocol conventionally used in home automation systems, fixed codes or rolling codes, or a combination thereof.

These features, among others, are conventionally offered in a wireless control system currently available on the market and sold under the trademark HomeLink®. This conventional wireless control system includes a control system that is at least partially disposed within a vehicle rearview mirror. For instance, a control unit of the one or more associated communication interfaces of the control system may be disposed within the vehicle rear view mirror. The wireless control system in this context may form part of a vehicle rearview mirror system that includes the vehicle rearview mirror as well as peripheral components and interfaces, such as a rear-mounted video camera and selectable inputs or buttons that enable operation by a vehicle operator. The vehicle rear view mirror system may include a wired communication interface, such as a CAN bus interface, configured to communicate over a vehicle bus with other vehicle mounted devices.

A communication transmitter or RF transmitter of the conventional wireless control system described above may be disposed within the vehicle rearview mirror, or elsewhere on or within the vehicle. Other possible locations for the RF transmitter include the engine compartment. Despite being configured to communicate with several home-based devices, the conventional wireless control system and its communication transmitter are often considered to be a dedicated system for use solely with home-based devices.

A variety of conventional stand-alone communications systems for communicating with systems other than home-based devices are also available in the marketplace. One such conventional standard-alone communication system is utilized for electronic toll collection systems. There are several different electronic toll collection systems in use today in the U.S., many of which form part of the E-ZPass electronic toll-collection system, the SunPass electronic toll-collection system or the EPass electronic toll-collection system. This system is used primarily for collecting tolls for roads, bridges, and tunnels. The principal arrangement of the E-ZPass system, and other conventionally configured electronic toll collection systems, includes a stand-alone transponder device that is placed on the windshield of the vehicle, and a reader associated with a tollbooth. More specifically, the E-ZPass system utilizes a self-contained transponder device that can be obtained from an issuing authority, and placed on the windshield of the vehicle.

In a conventional E-ZPass system, as the vehicle approaches the tollbooth, the self-contained transponder device becomes in proximity to the toll communication system, and can receive a signal broadcast by the toll communication system. The transponder device may be active such that it listens continuously for the broadcast signal, and in response to receiving the broadcast signal, may communicate a packet of information relating to an identity of the vehicle. The toll communication system may be in communication with an account system that maintains a database of accounts associated with transponder devices. The packet of information transmitted from the transponder, or a query based on the packet, can be communicated to the account system by the toll communication system. Based on feedback from the account system, the E-ZPass system may authorize access to a toll area, or record a toll fee against an account associated with the transponder device, or both. In some circumstances, authorizing access to a toll area may include communicating access information that is used to initiate movement of a toll gate.

A principle disadvantage of the E-ZPass system, and other conventional electronic control collection systems, is that the transponder is a physical, self-contained device that is associated with a particular vehicle and placed in proximity to the rearview mirror of the vehicle, potentially blocking any sensors thereof, to enable a clear path for transmissions between the transponder to communicate with the toll communication system. In this way, the transponder is positioned so that it is visible, and in some cases, capable of becoming an obstruction to other vehicle sensors (e.g., an ambient light sensor of the rearview mirror) when mounted. Placing the transponder out of sight, such as in a glove compartment of the vehicle, may avoid these issues but, in many cases, at the cost of substantially impairing the ability of the transponder to communicate effectively with the toll communication system. Further, because the transponder device is often physically associated with a particular vehicle, moving the transponder device from one vehicle to another can be an inconvenience, both in terms of relocating the transponder device and registering, in the E-ZPass system, the transponder with another vehicle. Additionally, the stand-alone transponders often rely on a single, stand-alone power source, such as a battery, that can become depleted and render the transponder non-functional with little or no indication beforehand.

SUMMARY OF THE DESCRIPTION

A vehicle rearview mirror system for a vehicle having communication capabilities for communicating with a building-automation device and an electronic toll collection system. The vehicle rearview mirror system may include a wireless communication system configured to communicate with at least one of a building-based communication system and a transceiver system of the electronic toll collection system.

In one embodiment, the vehicle rearview mirror system includes a power interface, an interior rearview mirror assembly, a wireless communication system, and a display controller. The power interface may receive power from a vehicle power source to power the vehicle rearview mirror system. The interior rearview mirror assembly may include a reflective element and a control unit configured to communicate with one or more vehicle-mounted components. The wireless communication system may be configured to communicate with a building-based communication system and a transceiver system of an electronic toll collection system, and may be operably coupled to the control unit and the power interface.

With communication capabilities, the wireless communication system may transmit a building-based information packet to the building-based communication system in response to a command from the control unit in order to initiate an operation of a building-based device. The wireless communication system may transmit a toll-based information packet to the electronic toll collection system in response to a command from said control unit in order to request authorized access to a toll area associated with the electronic toll collection system. The display controller may be configured to provide visual feedback to a vehicle operator indicative of a toll-pass account associated with the toll-based information packet.

In another embodiment, the vehicle communication system may include a building-oriented controller operably coupled to the power interface and the wireless communication system. The building-oriented controller may communicate, via the wireless communication system, with the building-based device to instruct the building-based device to initiate a building-based activity. The vehicle communication system may also include an electronic-toll controller configured to communicate identification information via the wireless communication system to the toll collection receiver.

The electronic-toll controller may receive mobile device information, via the wireless communication system, from a plurality of mobile devices located within the vehicle. The mobile device information may relate to a toll-collection account managed by the electronic toll collection system. Based on user input, the electronic-toll controller of the vehicle communication system may generate identification information as a function of the mobile device information from a selected mobile device from among the plurality of mobile devices. In this way, the vehicle communication system may enable user selection of the mobile device for authorizing access to a toll area associated with the electronic toll collection system.

In still a further embodiment, the vehicle communication system may include a controller operably coupled to a wireless communication system. The controller may generate a user notification based on detecting external communications indicative of a separate device transmitting communication to at least one of a building-based communication system and a electronic toll collection system. The controller may generate user notification indicating that the system is capable of communicating with at least one of the building-based communication system and the electronic toll collection system.

In yet another embodiment, a method of communicating between a vehicle and one or more remote devices may include supplying power from the vehicle to a wireless communication system of the vehicle, and receiving mobile device information from a plurality of mobile devices located within the vehicle, where the mobile device information relates to a toll-collection account managed by an electronic toll collection system. The method may further include selecting one of the plurality of mobile devices for requesting authorized access to a toll area associated with the electronic toll collection system. Based on receipt of an interrogation signal from an electronic toll collection system, an electronic-toll information packet may be transmitted from the wireless communication system to the electronic toll collection system, where the electronic-toll information packet includes information relating to identification of the toll-collection account associated with the selected mobile device. The method may yet further include receiving, via an input device, a command from a vehicle operator to initiate a requested operation of a building-based device, and based on the command, transmitting a building-oriented command from the wireless communication system to a building-based receiver, wherein the building-oriented command corresponds to the requested operation of the building-based device.

These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
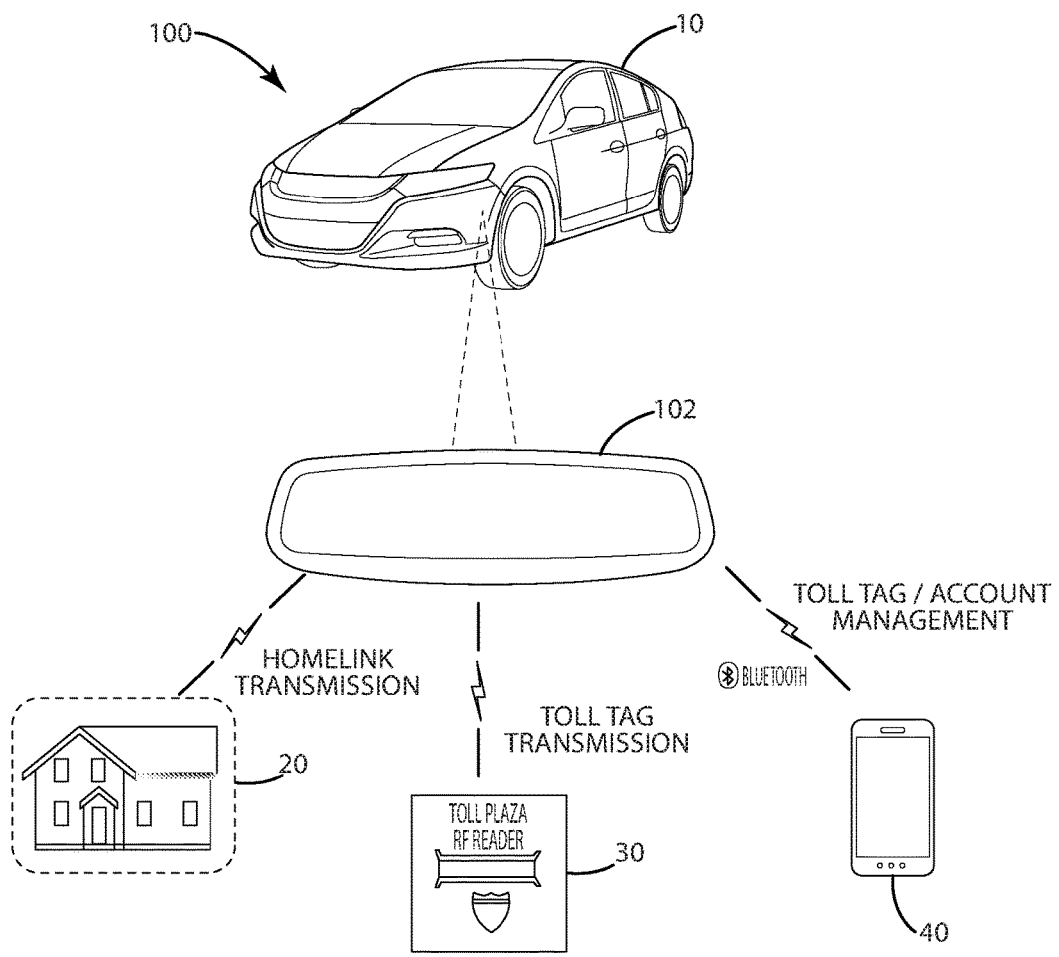
FIG. 1 shows a representative view of a vehicle communication system according to one embodiment of the present disclosure that incorporates a communication system into a rearview mirror assembly.

A communication system for a vehicle as shown in FIG. 1 and generally designated 100. The communication system 100 may be incorporated into a vehicle 10, depicted in FIG. 1 as a passenger car but is not so limited. The vehicle 10 may be any type of vehicle adapted for transportation, including, for example, sport utility vehicles (SUV), buses, trucks, commercial vehicles, watercraft, and aircraft. The communication system 100 may communicate with one or more mobile devices 40 associated with a vehicle operator or a vehicle passenger, or both.

The communication system 100 may be adapted to communicate with a building-based device 20 and an electronic toll collection system 30, both of which are shown in the illustrated embodiment of FIG. 1. For purposes of disclosure, the communication system 100 is described herein as communicating with a single building-based device 20 and a toll transceiver system of the electronic toll collection system 30, but it should be understood the communication system 100 may communicate with a plurality of building-based devices 20 and a plurality of toll transceiver systems. The building-based devices 20 may be any type of device or system associated with a home, dwelling, or building and configured to at least one of a) control one or more activities or b) sense parameters, such as device status or one or more environmental parameters. For instance, the building-based device 20 may report status information regarding a state of the device. Example environmental parameters ambient temperature, ambient light and motion. And, example activities can include control over lighting, heating, ventilation and air-conditioning (HVAC), appliances, and security locks for gates and doors. It is further noted that several features are described herein in connection with a building-based device 20—however, it should be understood that any one building-based device 20 may include a subset of such features. In other words, one building-based device 20 may be configured differently from another building-based device 20, and each of the building-based devices 20 may incorporate one or more features of the embodiments described herein.

Figure 4:
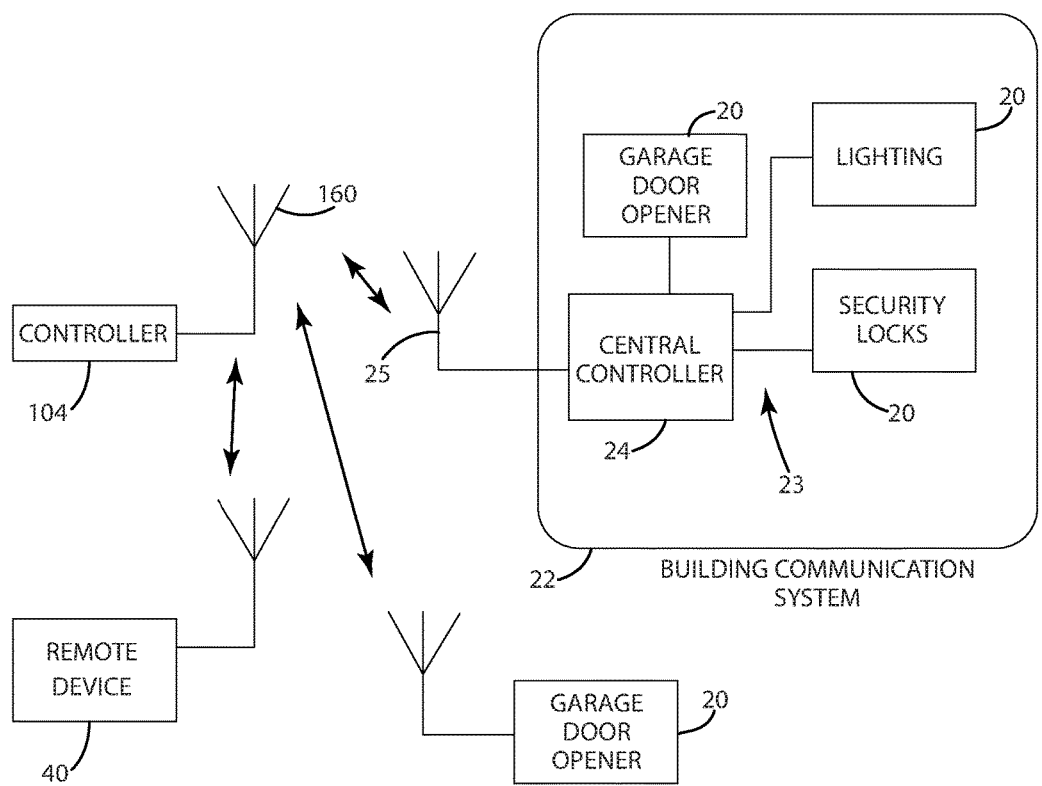
FIG. 4 shows a representative view of the vehicle communication system in conjunction with a variety of building-based devices FIG. 5 shoes a representative view of the vehicle communication system that incorporates a display and user interface features provided in a center stack of a vehicle.

In one embodiment, the building-based device 20 may form part of a building based automation system, such as the building automation system 22 in the illustrated embodiment of FIG. 4. In the illustrated embodiment, the building automation system 22 includes a plurality of building-based devices 20, at least one of which may be a building controller 24. The building controller 24 may be operably coupled to one or more other building-based devices 20 via a building network 23. The building network 23 may include a wired network or a wireless network, or a combination thereof, which may be coupled to and accessible via a network interface. The building controller 24 also may be operably coupled to a wireless command interface having a wireless communication antenna 25 through which communications from an external device may be received. In one embodiment, the building based automation system 22 may incorporate a building automation and control network (BACnet), Bluetooth low energy (BLE), Insteon, KNX, Universal Powerline Bus (UPB), X10, Wi-Fi, Zigbee, or Z-wave, or a combination thereof.

The wireless command interface of the building based automation system 22 may be coupled to the building controller 24 in a variety of ways. As an example, the wireless command interface may utilize an external network connection to communicate with the building network 23 and the building controller 24. As another example, the wireless command interface and the building controller 24 may establish a dedicated communication channel via wireless communication circuitry configured specifically for the dedicated communication channel. In one embodiment, the wireless command interface may be incorporated into the building controller 24.

Based on commands received via the wireless command interface, the building controller 24 may direct operations or activities of one or more other building-based devices 20 via the building network 23. Additionally, or alternatively, a command received via the wireless command interface may be directly communicated to one or more building-based devices 20 to effect operation corresponding to the command. In one embodiment, the wireless command interface may be incorporated into a building-based device 20, and may effect operation thereof in response to received communications. For example, the building-based device 20 may be a HomeLink® enabled device including a wireless command interface that directs operation of the building-based device 20 in response to communications received from a HomeLink® transmitter (e.g., a HomeLink® transmitter included in a vehicle). Although the system 100 is described in connection with one or two building automation systems 22, it should be understood that the system 100 may include one or more systems 22, one or more building-based devices 20, and one or more separate building-based device 20, or any combination thereof. As described herein, the system 100 may include a controller 104, which may communicate with one or more of the building automation systems 22 and building-based devices 20.

Figure 3:
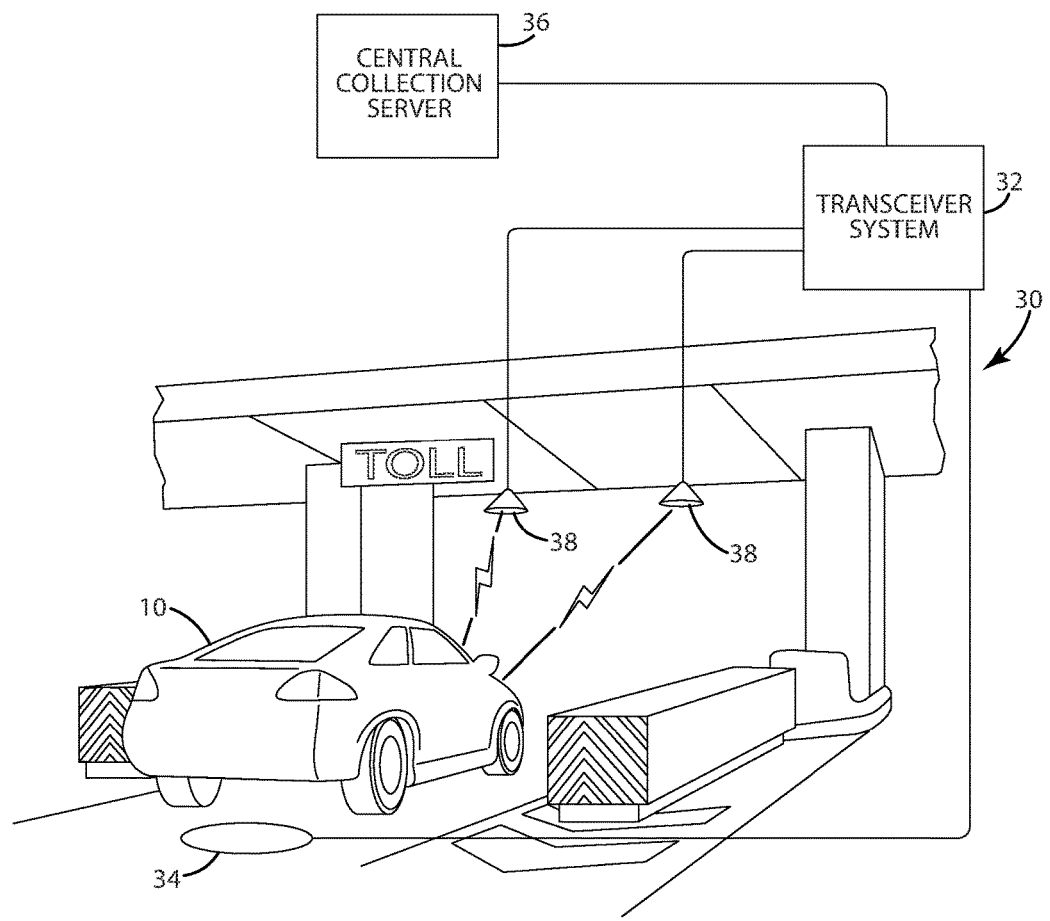
FIG. 3 shows a representative view of the vehicle communication system in conjunction with an electronic toll collection system.

In the illustrated embodiment of FIG. 3, the electronic toll collection system 30 may include a toll collection transceiver system 32 associated with a toll area, such as a toll road. The electronic toll collection system 30 in one embodiment may be capable of electronically collecting tolls or authorized access to the toll area. Access to the toll area may be authorized in a variety of ways, including, for example, by identifying a vehicle or transmitter as being authorized in a database, or removing a barrier to enable entry into the toll area, or both.

The toll collection transceiver system 32 of the electronic toll collection system 30 may transmit an interrogation signal via one or more interrogators or antennas 38. The interrogation signal may be intended to elicit an interrogation response from a transponder or the communication system 100 disposed in the vehicle 100. For instance, the toll collection transceiver system 32 may transmit the interrogation signal in response to sensing presence of the vehicle 10 in proximity thereto via a sensor 34. Example sensing configurations include an inductive based sensor that utilizes a loop disposed beneath the road surface. In some cases, the toll collection transceiver system 32 may transmit an interrogation signal continuously, waiting for a response from a nearby vehicle.

The transponder or communication system 100 may respond to the interrogation signal by transmitting a response signal, which may include the toll-based information packet with data relating to an account managed by the electronic toll collection system 30. The toll collection transceiver system 32 may communicate with a central collection server 36 regarding the toll-based information packet to facilitate determining whether to authorize access to the toll area.

As an example, based on the toll-based information packet, the electronic toll collection system 30 may determine whether a vehicle approaching the toll area has communicated information indicative of enrollment in the electronic toll collection system 30, and if enrolled, whether an account associated with the toll-based information packet includes sufficient funds for authorized access to the toll area. If the toll-based information packet is indicative of enrollment and sufficient funds are available, the electrical collection system 30 may initiate steps to transfer the funds from the account, and authorize access to the toll area. If sufficient funds are not available, if the information packet is not indicative of enrollment, or if no information packet is received, or a combination thereof, the electronic toll collection system 30 may not authorize access to the toll area.

Figure 2:
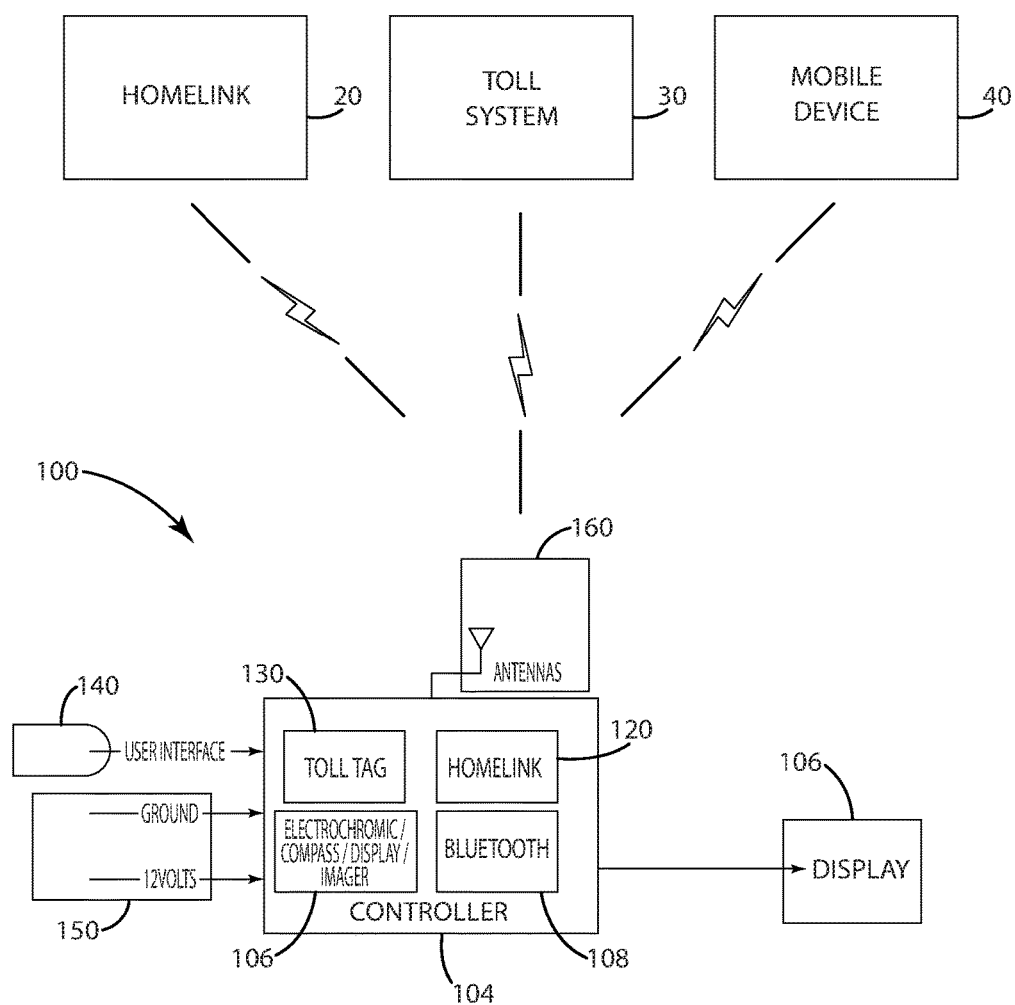
FIG. 2 shows a representative view of the vehicle communication system according to one embodiment of the present disclosure.
Figure 5:
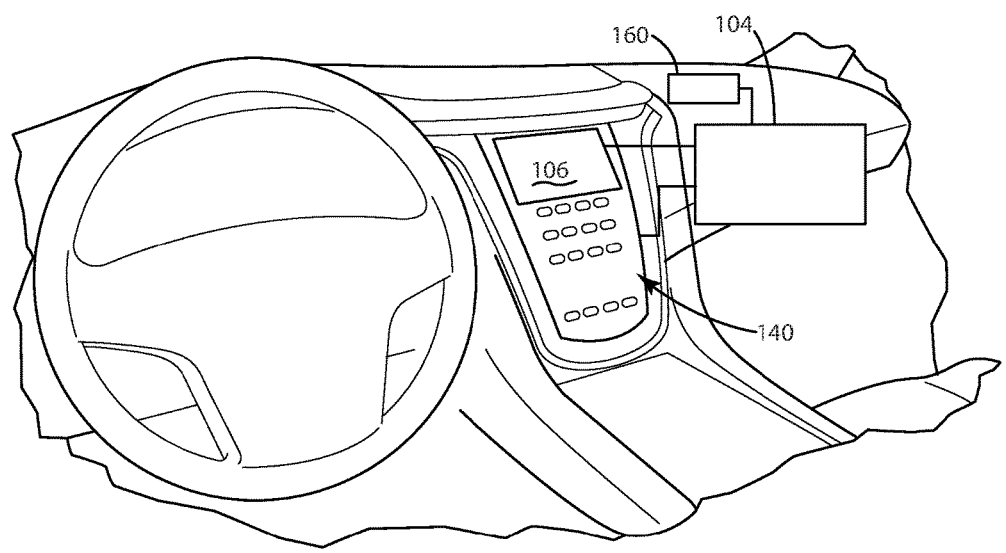

In the illustrated embodiment of FIGS. 1, 2 and 5, the communication system 100 includes a control unit 104 operably coupled to one or more antennas 160. The control unit 104 and the one or more antennas 160 may be incorporated into a rearview mirror system 102, as depicted in the illustrated embodiment of FIG. 1. However, it should be understood that the control unit 104 and the one or more antennas 160, and combinations and components thereof, may be disposed separate from the rearview mirror system 102. For instance, in the illustrated embodiment of FIG. 5, the control unit 104 is separate from a rearview mirror and utilizes a display 106 and user interface 140 provided in the center stack of the vehicle interior.

The one or more antennas 160 may be configured to communicate via a variety of communication protocols, including those associated with communications for the building-based device 20, the building-based communication system 22, the electronic toll collection system 30 and a mobile device 40, or a combination thereof. For instance, the communication system 100 may include an integrated antenna 160 capable of communicating with the mobile device 40, the electronic toll collection system 30 and the building based device 20. As another example, the communication system 100 may include a plurality of antennas 160 each capable of communicating with one or more external components, including the mobile device 40, the electronic toll collection system 30, and the building-based device 20. In one embodiment, each of the one or more antennas 160 may be coupled to an antenna driver (not shown) that may drive the associated antennas 160 based on commands or information received from the control unit 104. Each of the one or more antennas 160 also may be coupled to an antenna receiver (not shown) that may translate signals received by the associated antenna 160 into data for the control unit 104.

As an example, the control unit 104 may provide a toll based information packet to an antenna driver for transmission of the packet to the electronic toll collection system 30. And, likewise, the control unit 104 may receive information from the antenna receiver relating to an interrogation signal from the electronic toll collection system 30. Put differently, the antenna driver and the antenna receiver may enable data to be transmitted to or received from, or both, in connection with at least one of the mobile device 40, the building-based device 20, and the electronic toll collection system 30.

Although the one or more antennas 160 are described separate from the control unit 104, it should be understood that at least one of the one or more antennas 160 may be integrated in the control unit 104 such that the control unit 104 and the at least one antenna 160 form an integrated component.

The control unit 104 in the illustrated embodiment of FIG. 2 may include an electronic-toll controller 130, a building controller 120, and a mobile device controller 108 (e.g., a Bluetooth controller). By incorporating such a control unit 104 into the vehicle 10, a communication system 100 according to one embodiment may avoid use of conventional separate transponders or communicators for communicating with the home-based device or the electronic toll collection system 30 and also avoid the associated shortcomings of these standalone components, such as potentially blocking ambient light sensors of the vehicle 10 and having a single battery powered source that may be inaccessible. The building controller 120, as an example, can be a HomeLink controller forming part of a HomeLink system.

The HomeLink controller may include an integrated transceiver or a transmitter and a receiver that can be programmed to activate one or more building-based devices 20. The integrated transceiver of the building controller 120 may be compatible with building-based devices 20 that operate in the range of 288 to 433 MHz. It should be understood that building-based devices 20 and the integrated transceiver may be configured to operate at different frequencies, including ranges of frequencies that exclude one or more ranges of frequencies. For example, the integrated transceiver of the building controller 24 may be configured to operate at a variety of frequencies to maintain compatibility with one or more types of devices (e.g., building-based devices 20), including operation in the Bluetooth frequency range around 2.4 GHz and a vehicle to vehicle communication frequency between about 5 GHz and about 6 GHz.

The mobile device controller 108 in the illustrated embodiment may be a Bluetooth controller configured to pair with one or more mobile devices 40 disposed in the vehicle 10. The pairing process may establish a relationship between each mobile device 40 and the mobile device controller 108 of the communication system 100 such that a mobile device 40 may connect with the mobile device controller 108 without repeating the pairing process. This way, the mobile device 40 and the mobile device controller 108 may automatically connect with each other. For purposes of disclosure, the illustrated embodiment is described in connection with the mobile device controller 108 being a Bluetooth controller, but it should be understood that the disclosure is not so limited and that any type of controller and communications protocols may be used to communicate between the mobile device controller 108 and the one or more mobile devices 40, including for example Near Field Communication (NFC) or WiFi or IEEE 802.11 standard protocols, or a combination thereof.

It should further be understood that it is not necessary to establish a pairing relationship between the at least one mobile device 40 and the mobile device controller 108. For instance, as described herein, the mobile device controller 108 may transmit an interrogation request to any mobile devices 40 present in the vehicle 10 to request toll area authorization information for transmission to the electronic toll collection system 30 in order to obtain authorized access to a toll area. Mobile device users may receive an indication on a display of their mobile device 40 regarding the interrogation request, and in response to such a request, may authorize transmission of the toll area authorization information to the mobile device controller 108.

The electronic-toll controller 30 in the illustrated embodiment may be configured to communicate with one or more types of electronic toll collection systems, including those based on use of RFID transponders. Example electronic toll collection systems are the E-ZPass system and SunPass system utilized in several regions in North America. The E-ZPass system and other electronic toll collection systems may be based on the electronic toll collection system 30 described herein, and may utilize one or more communication protocols configured to communicate with an RFID transponder. Although described primarily in connection with communicating with an E-ZPass system, it should be understood that the electronic-toll controller 30 may be configured to communicate with any type of electronic toll collection system. Indeed, the communication system 100, including the electronic toll controller 30, may be adapted for compatibility with multiple types of electronic toll collection systems. In this way, the vehicle 10 may be dynamically configured to communicate with the type of electronic toll collection system present in proximity to the vehicle 10.

In some cases, the realm of electronic toll collection systems may change over time. There is a chance that a communication protocol for a given type of electronic toll collection system 30 may change, or that another type of electronic toll collection system 30 may arise. The electronic toll controller 30 according to one embodiment may be reconfigurable or field programmable to maintain compatibility with any such changes or to expand compatibility with electronic toll collection systems not initially identified or considered during manufacture of the electronic toll controller 30. For instance, the communication system 100 may be configured to obtain compatibility information from a compatibility server via a communication channel. The compatibility information may be related to communication protocols for an electronic toll collection system 30, but is not so limited—the compatibility information obtained from a compatibility server may enable the communication system 100 to update any of its communication protocols or obtain new communication protocol for communicating with any device, including, for example, electronic toll collection systems, building-based devices, and mobile devices, or a combination thereof.

In one example, the communication system 100 may obtain compatibility information from a mobile device 40 via wireless communication connection. For instance, in conducting a Bluetooth pairing with the mobile device 40, the mobile device 40 may provide compatibility information relating to an electronic toll collection system 30 associated with identification information stored in the mobile device 40. In this way, the communication system 100 may be configurable by the mobile device 40 to communicate with a specific electronic toll collection system 30.

In one embodiment, the communication system 100, including the electronic-toll controller 130, incorporated into the vehicle 10 may be configured to communicate with the electronic toll collection system 30 in a manner similar to a conventional RFID transponder such that, from the perspective of electronic toll collection system 30, the electronic toll controller 130 of the vehicle 10 appears as an RFID transponder enrolled in the electronic toll collection system 30. In other words, from the perspective of the electronic toll collection system 30, communications with the communication system 100 may be indistinguishable from communications with a self-contained RFID transponder that is conventionally utilized for communicating with the electronic toll collection system 30.

For instance, in a conventional self-contained RFID transponder utilized in the E-ZPass system, the RFID transponder may wait to receive an interrogation signal from the electronic toll collection system 30, and in response to receiving the interrogation signal, may communicate a response signal that initiates a transaction process according to a communications protocol that ultimately leads to authorized access to a toll area. The transaction process may include communicating, from the RFID transponder, information that identifies an account associated with the RFID transponder and managed by the electronic toll collection system 30. In particular, the RFID transponder may communicate a transponder serial number that is linked to an account managed by the electronic toll collection system.

The communication system 100, including the electronic-toll controller 130, may be configured to communicate in a similar manner. That is, the communication system 100 may respond to an interrogation signal from the electronic toll collection system 30 in a manner similar to the RFID transponder, including, for example, communicating a transponder serial number or other identifying information to aid the electronic toll collection system 30 in identifying an account associated with the communications from the communication system 100. In one embodiment, the electronic-toll controller 130 may be programmed with or store in memory a unique transponder serial number that the electronic-toll controller 130 may communicate to the electronic toll collection system 30 in response to detection of an interrogation signal received from the electronic toll collection system 30. As an example, the unique transponder serial number may be pre-programmed in the electronic-toll controller 130 during manufacture of the communication system 100.

Additionally or alternatively, the electronic-toll controller 130 may be field programmable with a transponder serial number or other identifying information for use in conjunction with the electronic toll collection system 30 such that a vehicle operator may reconfigure the electronic-toll controller 130 to utilize a specific transponder serial number or specific identifying information that is associated with the vehicle operator's account, which is managed by the electronic toll collection system 30. In this way, the electronic-toll controller 130 of the communication system 100 may be considered a "trainable toll pass". In other words, the electronic-toll controller 130 may be trained to communicate with the electronic toll collection system 30 using information associated with a user's account, which may be obtained in a variety of ways, including, for example, from the mobile device 40. Optionally, the communication system 100 may obtain the identifying information or transponder serial number automatically from an RFID transponder being used by the vehicle operator.

Automatic programmability of the communication system 100 may be achieved in a variety of ways, including, for instance, by monitoring communications between a conventional RFID transponder and the electronic toll collection system 30, and providing feedback to the vehicle operator indicative of automatic programmability capabilities and requesting confirmation to store identifying information for use in conjunction with the electronic toll collection system 30. Alternatively, or additionally, automatic programmability may be achieved by initiating a programming mode in which the communication system 100 generates an interrogation signal to elicit a response from an RFID transponder. The response may be analyzed by the electronic-toll controller 130, and identifying information associated with an account managed by the electronic toll collection system 30 may be stored in memory based on the analysis. Thereafter, the communication system 100 may operate in a manner that appears identical to the RFID transponder used for programming.

If the electronic toll controller 130 of the communication system 100 is configured to interact with the electronic toll collection system 30, and a conventional RFID transponder is located within the vehicle 10, there may be a potential conflict over which of the communication system 100 or the conventional RFID transponder communicates with the electronic toll collection system 30 in proximity to the vehicle 10. The electronic toll controller 130 may be configured to detect presence of the conventional RFID transponder, and to defer or suspend transaction negotiations with the electronic toll collection system to allow the conventional RFID transponder to handle transacting with the electronic toll collection system 30 and obtaining authorized access to a toll area. Additionally, or alternatively, the electronic toll controller 130 may be configured to detect presence of a conventional RFID transponder, and to alert the vehicle operator via the display 106 that the conventional RFID transponder is unnecessary and to remove it or store it in an location (e.g., a glove compartment) where the conventional RFID transponder is substantially incapable of communicating with the electronic toll collection system 30. In this way, the communication system 100 may avoid potential conflicts prior to receiving an interrogation signal from the electronic toll collection system 30 to initiate a transaction.

The electronic toll controller 130 in one embodiment may dynamically generate identifying information to communicate to the electronic toll collection systems 30 in response to receipt of an interrogation signal from the electronic toll collection system. Dynamic generation of the identifying information may be achieved in variety of ways.

In the illustrated embodiment, the mobile device controller 108 may communicate with one or more mobile devices 40 that have been paired with the mobile device controller 108, or that are present within the vehicle, or a combination thereof, in order to obtain authorization information from the one or more mobile devices 40. This authorization information may be used by the mobile device controller 108 to generate identifying information for transmission to the electronic toll collection system 30 in response to detecting an interrogation signal from a toll collection transceiver. For instance, after receiving the interrogation signal from the electronic toll collection system 30, the mobile device controller 108 may communicate a request to one or more mobile devices 40 to authorize use of an account associated with the mobile device 40 or a user thereof. Information relating to the account may be used by the communication system 100 as a basis for requesting access to a toll area under control of the electronic toll collection system 30. The user of the mobile device 40 may receive a notification on their device that authorization for account access or usage is being requested. The user may respond to this notification, enabling or denying authorization of an account associated with the mobile device 40. In this way, the user of the mobile device 40 may be capable of real-time management of electronic toll payments via the mobile device 40. If more than one user and mobile device 40 is located in the vehicle, each user may selectively choose to pay a toll, thereby enabling real-time management over payment of tolls from more than one device in the vehicle.

It should be noted that a notification regarding a request for access to an account may be provided prior to receiving an interrogation signal from a toll collection transceiver. The mobile device controller 108 may preauthorize use of an account by notifying or requesting authorized access prior to nearing a toll collection transceiver. Preauthorization may occur in a variety of ways and at a variety of times. As an example, the system may preauthorize use of an account associated with a mobile device 40 when the mobile device 40 initially communicates with or pairs with the system. As another example, preauthorization may occur around when ignition of the vehicle 10 occurs. In yet another example, the system may utilize Global Positioning System (GPS) to identify an approaching toll area, and request authorization from the mobile device 40 ahead of reaching that toll area. With the system being preauthorized to utilize an account associated with the mobile device 40, the system may automatically utilize information associated with the account and automatically communicate with the electronic toll collection system 30 to obtain authorized access to a toll area. It should be understood that, alternatively, the system may wait until after receiving an interrogation signal to prompt a user of the mobile device 40 for authorization to utilize an account associated with the mobile device 44 obtaining authorized access to toll area.

Alternatively or additionally, the communication system 100 may communicate information to the user interface 140 of the communication system 100 requesting confirmation of authorization, including preauthorization, to use an account associated with a mobile device 40 to generate the identifying information for requesting access to the toll area from the electronic call collection system 30. If multiple mobile devices 40, and respective multiple accounts, are available, the user interface 140 may provide user selection of one mobile device 40 or one account to use as a basis for generating the identification information to be transmitted to the electronic toll collection system. In one embodiment, regardless of whether there is one or multiple mobile devices 40 present, the communication system 100 may indicate, on a display associated with the user interface 140, information indicative of the account being used as a basis for requesting authorized access to a toll area.

In one embodiment, the account utilized by the electronic toll controller 130 may be a shared account such that more than one vehicle 10 may conduct transactions with the electronic toll collection system 30 using the same shared account. For instance, a fleet of vehicles owned or operated by a common entity may be configured to utilize the same shared account with the communication system 100. The programmability of the communication system 100 of such a fleet of vehicles may aid in avoiding use of separate conventional toll-pass transponders for each vehicle in the fleet, thereby reducing costs associated with such conventional transponders.

In one embodiment, the fleet of vehicles may be a fleet of rental vehicles, each having a communication system 100 tied to one or more shared accounts. With this arrangement, the rental vehicles may be rented out to vehicle operators without having the vehicle operators consider whether they may encounter toll areas under control of an electronic toll collection system. The rental entity may charge back any tolls paid from their account directly to the account that the vehicle operator used to rent the rental vehicle.

One or more of the described components of the control unit 104 may be separate from the control unit 104, but for purposes of disclosure, these components are described as being part of an integrated control unit 104. The control unit 104 may be coupled to a power interface 150 provided by the vehicle 10 such that the control unit 104, and its components, receive power from a vehicle supply, which may include a battery (not shown) or a vehicle generator, or both. In this way, the control unit 104 may be coupled to a separate, stable power source rather than an independent battery, thereby substantially preventing the communication system 100 from becoming disabled due to loss of power (unless the vehicle battery, itself, becomes depleted).

In the illustrated embodiment of FIG. 2, the controller 104 may include a building controller 120 or a home-oriented controller or a building-oriented controller configured to communicate with the one or more building-based devices 20, as described herein. The building controller 120 may be configured to communicate commands or instructions to the one or more building-based devices 20 via the one or more antennas 160.

Further, the building controller 120 may be programmable or trainable to communicate with the one or more building-based devices 20. For instance, in one embodiment, the one or more building-based devices 20 may be at least one of a garage door opener, gate operator, or a home lighting system that utilizes a rolling key based authorization system. The building controller 120 may be trained or configured to store in memory a rolling key algorithm associated with a specific building-based device 20. Storage of the rolling key algorithm or one or more parameters associated therewith may occur during an association phase in which the building controller 120 and the communication system 100 are associated with the specific building-based device 20. Although described in connection with associating one building-based device 20 with the building controller 120, it should be understood that the building controller 120 may be associated with multiple building-based devices 20.

The building controller 120 may be configured to communicate a command to one or more building-based devices 20 that are associated with the building controller 120. The communicated command may include instructions or parameters that relate to a type of activity or action to perform, or may be a message, such as a key, that the building-based device 20 is configured to a) respond to in a predetermined manner or b) to take a predetermined action, or any combination thereof. An example of a predetermined action is opening a garage door in response to receipt of a valid key in the building-based device 20.

In one embodiment, the building controller 120 may be configured to transfer information relating to authorization for operating one or more building-based devices 20 to the mobile device 40. As an example, the building controller 120 may utilize "token" based authentication and server authentication in addition or as an alternative to stored keys to effect authorized operation of a building-based device 20, including obtaining sensed parameter information from the building-based device 20 or to initiate an activity, or both. Token based authentication in one embodiment may include generation of a token, in the building controller 120, based on a stored key. The token may be transmitted to a building-based device 20, which may confirm whether the token is authorized by comparing the token against one or more criteria, including, for example, a complementary token generated in the building-based device 20 that is based on a key stored in the building-based device 20. In one embodiment, the keys stored in the building controller 120 and the building-based device 20 may be the same, and generation of tokens is based on hashing of the stored keys with a hashing algorithm so that authentication is confirmed if the token generated by the building controller 120 matches the token generated by the building-based device 20. This example is provided for purposes of disclosure, and it should be understood that any type of token-based authentication system may be utilized.

As another example, the building controller 120 may communicate identification or rolling key information for storage in the mobile device 40. In response to a request by the vehicle operator to activate a building-based device 20, the building controller 120 may retrieve information from the mobile device 40 that is based on the stored information and that authorizes activation of the building-based device 20. The mobile device 40 may function as an authorization key for operating an associated building-based device 20 by providing information to the building controller 20 of the communication system 100. This information may be used by the building controller 130 as a basis for requesting activation of the building-based device 20. The mobile device 40 may be moved from one vehicle to another vehicle, and provide the same or similar functionality for activating the building-based device.

In the illustrated embodiment of FIG. 2, the controller 104 may be coupled to a display 106 capable of providing feedback to a vehicle operator. The display 106 may be incorporated in the rearview mirror assembly 102, as depicted in the illustrated embodiment of FIG. 1. However, in an alternative embodiment, the display 106 may be located outside the rearview mirror assembly 102, such as in the vehicle dash or center stack. The controller 104 may include a display controller or module 116 capable of directing display of information on the display 106. With the display 106, the communication system 100 may provide feedback to the vehicle operator, and enable operator interaction with the controller 104.

Examples of feedback provided to the vehicle operator via the display 106 include training information or registration information related to configuration of the communication system 100 with at least one of an electronic toll collection system, one or more building-based devices 20, and the one or more mobile devices 40. The training information and the registration information may include prompts or informative instructions or information relating to a training process or a registration process, or a combination thereof, that are provided to the operator via the display 106 to facilitate configuring or interacting with the communication system 100. For instance, the prompts or informative instructions may direct the operator to conduct one or more steps to facilitate configuration.

Another example of feedback provided to the vehicle operator via the display 106 includes tell-tale information relating to approaching events or objects, such as an approaching toll location. To facilitate providing such tell-tale information, the communication system 100 may be operably coupled to a GPS system of the vehicle 10 or the mobile device 40, and configured to obtain location information therefrom with respect to the vehicle 10 and land-based locations of interest, such as toll locations, destinations, construction areas and temporary blockages caused by, for example, an accident.

Yet another example of feedback provided via the display 106 includes identification of payment of a toll associated with authorized access being granted from an electronic toll collection system. For instance, the display 106 may indicate to the vehicle operator that she just paid $6.00 to obtain authorized access to a toll area. Identification of payment of a toll may include a total trip cost or an accumulation of tolls paid over the course of a trip segment. The display 106 may further display balance information relating to an available balance of an account selected for payment of a toll for authorized access to a toll area.

Additionally, or alternatively, the display 106, after or while the communication system 100 establishes authorized access to a toll area controlled by the electronic toll collection system 30, may indicate to the vehicle operator that authorized access has been granted or that the toll payment has been acknowledged. In this way, the vehicle operator can be informed of one or more steps in the transaction process so that the vehicle operator may be aware of progress, and that the communication system 100 is operating to obtain authorized access.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A vehicle communication system for a vehicle, said vehicle communication system comprising:
    a power interface configured to receive power from a vehicle power source;
    a user interface disposed within a vehicle cabin of the vehicle, said user interface including a display disposed on a console or a mirror of the vehicle, wherein said user interface is operable to receive user input from a user of the vehicle;
    wireless communication circuitry configured to communicate information to one or more remote devices, said wireless communication circuitry integrated into the vehicle such that the vehicle is operable to communicate said information to the one or more remote devices, the one or more remote devices including at least one toll collection receiver of an electronic toll collection system;
    an electronic-toll controller operably coupled to said power interface and said wireless communication circuitry, said electronic-toll controller communicatively coupled to at least one of said display and said user interface, said electronic-toll controller configured to communicate identification information via said wireless communication circuitry to the at least one toll collection receiver; and
    wherein said electronic-toll controller is configured to receive mobile device information, via said wireless communication circuitry, from one or more mobile devices located within the vehicle, wherein said mobile device information relates to a toll-collection account managed by the electronic toll collection system, wherein based on said user input, said electronic-toll controller generates said identification information as a function of said mobile device information from a selected mobile device from among the one or more mobile devices, whereby the vehicle communication system enables user selection of the selected mobile device for authorizing access to a toll area associated with the electronic toll collection system.

2. The vehicle communication system of claim 1, wherein the one or more remote devices includes at least one building-based device, and further comprising a building-oriented controller operably coupled to said power interface and said wireless communication circuitry, said building-oriented controller configured to communicate, via said wireless communication circuitry, with the at least one building-based device to instruct the building-based device to initiate a building-based activity.

3. The vehicle communication system of claim 2, wherein said wireless communication circuitry includes a first antenna and a second antenna, said first antenna being operably coupled to said building-oriented controller, said second antenna being operably coupled to said electronic-toll controller.

4. The vehicle communication system of claim 2, wherein communication with the at least one building-based device includes a building-based command with information relating to request to at least one of open a garage door, open a gate, turn on a light, unlock a door, and adjust a thermostat setting.

5. The vehicle communication system of claim 2, wherein the mobile device is a Bluetooth-enabled cellular phone, wherein said wireless communication circuitry, the building-oriented controller and the electronic-toll controller are disposed on or within a rearview mirror assembly that is positionable within the vehicle.

6. The vehicle communication system of claim 2, wherein said wireless communication circuitry, said building-oriented controller and said electronic-toll controller are disposed on the vehicle; wherein said display and said user interface are incorporated into a center stack of the vehicle cabin; and
    wherein said electronic-toll controller and building-based controller are communicatively coupled to at least one of said display and said user interface.

7. The vehicle communication system of claim 1, wherein said wireless communication circuitry includes one or more communication systems, wherein each of said one or more communication systems includes at least one of a receiver and a transmitter.

8. The vehicle communication system of claim 1, wherein said wireless communication circuitry of the vehicle is configured to form a Bluetooth pairing with the mobile device to establish an association between a toll account associated with the mobile device and said electronic-toll controller.

9. The vehicle communication system of claim 1, wherein the one or more mobile devices includes a plurality of mobile devices.

10. A method of communicating between a vehicle and one or more remote devices, said method comprising:
    supplying power from the vehicle to a wireless communication system of the vehicle;
    providing a user interface within a vehicle cabin of the vehicle, the user interface configured to receive user input from a user of the vehicle, wherein the user interface includes a display disposed on a console or a mirror of the vehicle, wherein the display is operable to provide feedback to the user;
    receiving mobile device information from a plurality of mobile devices located within the vehicle, wherein the mobile device information relates to a toll-collection account managed by an electronic toll collection system;

selecting, based on the user input, one of the plurality of mobile devices for requesting authorized access to a toll area associated with the electronic toll collection system;

generating, in a control system of the vehicle, information relating to identification of the toll-collection account associated with the selected mobile device, wherein the information is generated based on the mobile device information received from the selected mobile device;

receiving, via the wireless communication system, an interrogation signal from the electronic toll collection system; and based on the interrogation signal, transmitting an electronic-toll information packet from the wireless communication system of the vehicle to the electronic toll collection system, wherein the electronic-toll information packet includes the information relating to identification of the toll-collection account associated with the selected mobile device.

11. The method of claim 10, further comprising:

receiving, via an input device, a command from a vehicle operator to initiate a requested operation of a building-based device; and based on the command, transmitting a building-oriented command from the wireless communication system to a building-based receiver, wherein the building-oriented command corresponds to the requested operation of the building-based device.

12. The method of claim 11, further comprising:

storing, in the mobile device, authorization information relating to the building-based device, wherein the authorization information includes a stored key; and generating a token based on the stored key for obtaining authorized access to one or more operations of the building-based device.

13. The method of claim 10, further comprising:

receiving account identification information from a mobile device via the wireless communication system; and wherein the electronic-toll information packet that is transmitted to the electronic toll collection system includes information based on the account identification information received from the mobile device.

* * * * *